United States Patent [19]
Williams et al.

[11] Patent Number: 5,513,323
[45] Date of Patent: Apr. 30, 1996

[54] METHOD AND APPARATUS FOR MULTISTAGE DOCUMENT FORMAT TRANSFORMATION IN A DATA PROCESSING SYSTEM

[75] Inventors: Marvin L. Williams, Lewisville, Tex.; Roselyn H. Yun, Honolulu, Hi.

[73] Assignee: International Business Machines Corporation, Armonk, N.Y.

[21] Appl. No.: 715,179

[22] Filed: Jun. 14, 1991

[51] Int. Cl.$^6$ .................. G06F 5/00; G06F 3/00; H01J 13/00
[52] U.S. Cl. .............. 395/200.18; 395/500; 364/DIG. 1
[58] Field of Search ..................... 395/500, 200, 395/200.18; 364/949.94

[56] References Cited

U.S. PATENT DOCUMENTS 5,088,032  2/1992  Bosack ............................. 395/200
5,101,451  3/1992  Ash et al. ......................... 379/221
5,251,314  10/1993  Williams .......................... 395/600

Primary Examiner—Parshotam S. Lall
Assistant Examiner—Kenneth R. Coulter
Attorney, Agent, or Firm—Andrew J. Dillon

[57] ABSTRACT

A method and apparatus for determining an optimal multistage transformation from a first document format to a second document format via multiple format type transformation applications. Each document format type within a data processing system is identified and associated with a node within a format type network. An expenditure cost associated with each format type transformation application, such as time cost or information loss cost, is identified and associated with a link between two associated nodes in the format type network. An optimal path from a first node within the format type network to a second node is then calculated by means of links having minimal expenditure cost associated therewith. In one depicted embodiment of the present invention an optimal path from a selected node to all other nodes within the format type network is calculated and utilized for all future desired transformations.

8 Claims, 2 Drawing Sheets

| ID | NODE | ADJACENT NODE | COST |
|----|------|---------------|------|
| 0 | IA5 | - | 0 |
| 1 | ASCII | IA5 | 2 |
| 2 | ODA | IA5 | 4 |
| 3 | RFT | IA5 | 5 |
| 4 | SGML | - | 10000 |
| 5 | FFT | - | 10000 |
| 6 | MO:DCA | - | 10000 |

*Fig. 3a*

| ID | NODE | ADJACENT NODE | COST |
|----|------|---------------|------|
| 0 | IA5 | - | 0 |
| 1 | ASCII | IA5 | 2 |
| 2 | ODA | IA5 | 4 |
| 3 | RFT | ASCII | 4 |
| 4 | SGML | - | 10000 |
| 5 | FFT | ASCII | 9 |
| 6 | MO:DCA | - | 10000 |

*Fig. 3b*

| ID | NODE | ADJACENT NODE | COST |
|----|------|---------------|------|
| 0 | IA5 | - | 0 |
| 1 | ASCII | IA5 | 2 |
| 2 | ODA | IA5 | 4 |
| 3 | RFT | ASCII | 4 |
| 4 | SGML | ODA | 8 |
| 5 | FFT | ASCII | 9 |
| 6 | MO:DCA | - | 10000 |

*Fig. 3c*

| ID | NODE | ADJACENT NODE | COST |
|----|------|---------------|------|
| 0 | IA5 | - | 0 |
| 1 | ASCII | IA5 | 2 |
| 2 | ODA | IA5 | 4 |
| 3 | RFT | ASCII | 4 |
| 4 | SGML | RFT | 7 |
| 5 | FFT | RFT | 8 |
| 6 | MO:DCA | - | 10000 |

*Fig. 3d*

| ID | NODE | ADJACENT NODE | COST |
|----|------|---------------|------|
| 0 | IA5 | - | 0 |
| 1 | ASCII | IA5 | 2 |
| 2 | ODA | IA5 | 4 |
| 3 | RFT | ASCII | 4 |
| 4 | SGML | RFT | 7 |
| 5 | FFT | RFT | 8 |
| 6 | MO:DCA | SGML | 14 |

*Fig. 3e*

| ID | NODE | ADJACENT NODE | COST |
|----|------|---------------|------|
| 0 | IA5 | - | 0 |
| 1 | ASCII | IA5 | 2 |
| 2 | ODA | IA5 | 4 |
| 3 | RFT | ASCII | 4 |
| 4 | SGML | RFT | 7 |
| 5 | FFT | RFT | 8 |
| 6 | MO:DCA | FFT | 13 |

*Fig. 3f*

| ID | NODE | ADJACENT NODE | COST |
|----|------|---------------|------|
| 0 | IA5 | - | 0 |
| 1 | ASCII | IA5 | 2 |
| 2 | ODA | IA5 | 4 |
| 3 | RFT | ASCII | 4 |
| 4 | SGML | RFT | 7 |
| 5 | FFT | RFT | 8 |
| 6 | MO:DCA | FFT | 13 |

*Fig. 3g*

METHOD AND APPARATUS FOR MULTISTAGE DOCUMENT FORMAT TRANSFORMATION IN A DATA PROCESSING SYSTEM

BACKGROUND OF THE INVENTION

1. Field of the Invention

The present invention relates to the field of object type transformations and in particular to the field of multiple stage document format type transformations. Still more particularly the present invention relates to a method and apparatus for determining an optimal multiple stage transformation from a first document format to a second document format.

2. Description of the Prior Art

In the modern electronic office environment documents or other objects may exist in many different formats or types. For example, it is common for a document to exist in any one of multiple word processing formats, image formats, graphic formats, facsimile formats, binary formats or other user-defined formats. In a multi-vendor network environment documents may be sent from one user to another user wherein each user may utilize different document editors to work with the document. In situations in which each user desires to edit the document within a different format it is therefore necessary to provide document transformation applications which may be utilized to convert the document from an original document type to a second document type which is manipulatable by the receiver.

Those situations in which a document type may be simply and efficiently transformed from a first document format to a second document format utilizing an existing transformation application are simple and efficient to utilize. However, the increasing complexity and number of document formats which are available in the modern electronic office environment make it necessary to utilize hundreds of different document transformation applications in order to be able to convert a document to a desired format or type.

Additionally, it is often necessary for a document to be transformed into an intermediate stage prior to ultimate conversion to the desired document type due to the lack of a direct transformation application capable of transforming the original document to the desired document format.

The existence of such multistage document transformation applications has meant that there was no expedient and/or efficient method to determine the existence or non-existence of a multistage format transformation. In modern electronic systems which are capable of performing hundreds of multiple transformations a need existed for a technique to determine whether or not a multiple stage format transformation is possible in order to avoid the expenditure of enormous amounts of processor assets. Such a method and apparatus is disclosed in U.S. patent application Ser. No. 07/685,810, filed Apr. 16, 1991 by the inventors herein named an assigned to the assignee herein. That application discloses a method and apparatus for identifying the existence of multiple stage document format transformations. However, it should be apparent that the mere existence of a multiple stage document format transformation is generally not sufficient and a need exists for a method and apparatus whereby a particular optimal transformation from one document format to a second document format must be identified.

SUMMARY OF THE INVENTION

It is therefore one object of the present invention to provide an improved method and apparatus for object type transformations.

It is another object of the present invention to provide an improved method and apparatus for multiple stage document format transformations.

It is yet another object of the present invention to provide an improved method and apparatus for determining an optimal multistage transformation from a first document format to a second document format.

The foregoing objects are achieved as is now described. The method and apparatus of the present invention may be utilized to determine an optimal multistage transformation from a first document format to a second document format via multiple format type transformation applications. Each document format type within a data processing system is identified and associated with a node within a format type network. An expenditure cost associated with each format type transformation application, such as time cost or information loss cost, is identified and associated with a link between two associated nodes in the format type network. An optimal path from a first node within the format type network to a second node is then calculated by means of links having minimal expenditure cost associated therewith. In one depicted embodiment of the present invention an optimal path from a selected node to all other nodes within the format type network is calculated and utilized for all future desired transformations.

The above as well as additional objects, features, and advantages of the invention will become apparent in the following detailed description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 3a–3g form a series of expenditure arrays which may be utilized to evaluate an optimal path through the document type network of FIG. 2.

DETAILED DESCRIPTION OF THE INVENTION

Figure 1:
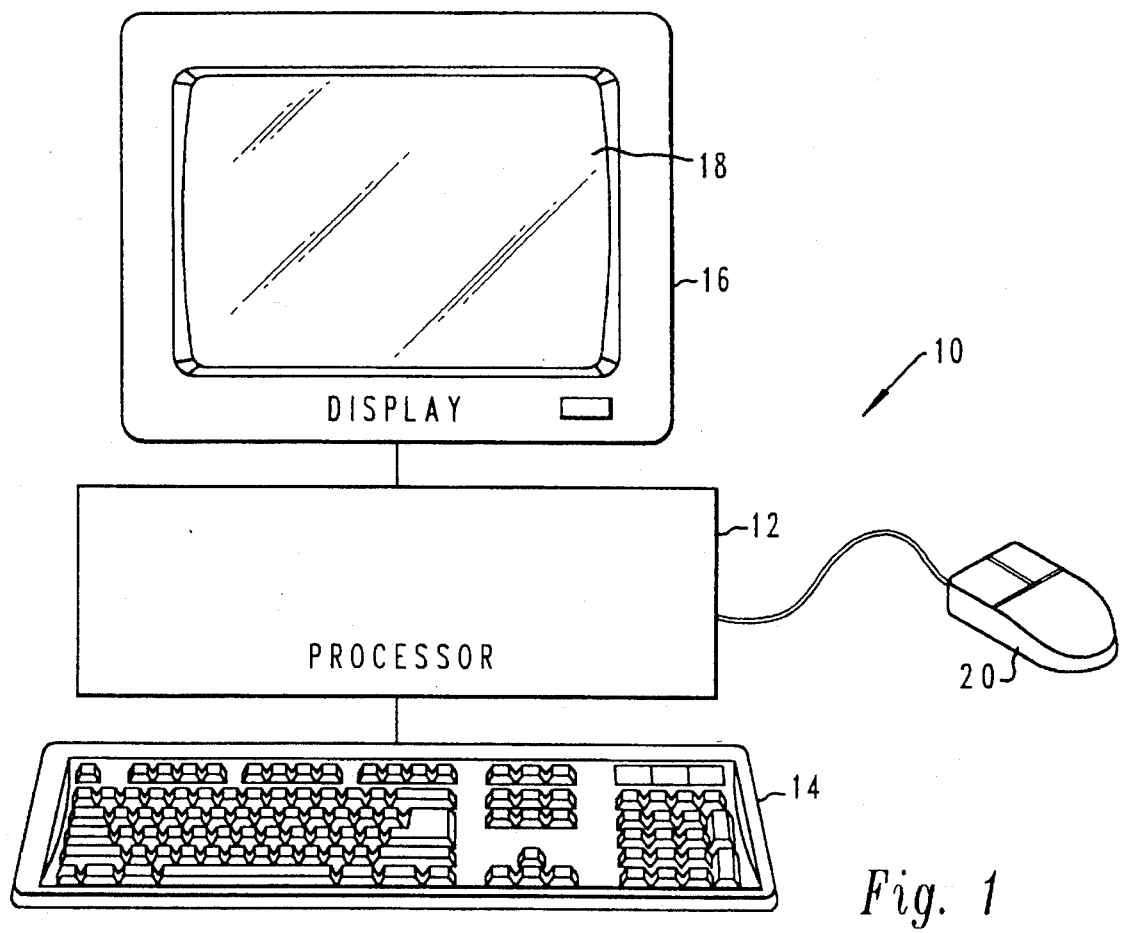
FIG. 1 is a pictorial representation of a data processing system which may be utilized to implement the method and apparatus of the present invention.

With reference now to the figures and in particular with reference to FIG. 1, there is depicted a pictorial representation of a data processing system 10 which may be utilized to implement the method and apparatus of the present invention. As is illustrated, data processing system 10 includes a processor 12 which is coupled to keyboard 14 and display device 16 in a manner well known in the art. Display device 16 includes a display screen 18 which may be utilized to graphically depict at least a portion of the format type network utilized in accordance with the present invention and depicted within FIG. 2 herein.

Those skilled in the art will appreciate that data processing system 10 may be implemented by utilizing any suitable computer including the so-called "personal computer" or a workstation coupled to a mainframe host computer. One example of a data processing system which may be utilized to implement the method and apparatus of the present invention is the International Business Machines Corporation personal computer PS/2.

As those skilled in the art will appreciate data processing system 10 may be utilized to process documents or other objects which are coupled to data processing system 10 via a distributed data processing network or loaded into data processing system 10 utilizing magnetic storage media and direct access storage devices such as disk drives, which are normally provided within processor 12. Documents or other objects loaded within data processing system 10 may exist in a wide variety of types and may be formatted in a wide variety of document formats. For example, many different word processing formats exist, each including format characteristics which are specific to the format selected by the manufacturer of that data processing system.

Additionally, international standards such as ASCII and International ASCII Version 5 (IA5) also exist and are commonly utilized to transfer documents between data processing systems. Alternatively, various levels of word processing format may exist within a single word processing format, such as the Revisable Format Text format (RFT) and Final Format Text (FFT) formats. Similarly, facsimile formats or graphic markup languages, such as SGML, also exist. There are, in a modern state-of-the-art computer system, literally thousands of formats which may be utilized to characterize the manner in which data is stored within a document or object. The conversion of one document or object format to another document or object format is also well known in the art. For purposes of explanation herein the term "document" shall be utilized to mean any collection of data identifiable as a data object within a data processing system and the term "format" shall be used to signify either a format or type associated with such a data object.

While many format conversion applications exist in the prior art each of these conversions is generally capable of converting from a stated source document format into a defined target document format. However, it should be apparent that by sequentially utilizing many different transformation applications it is possible to convert one document format into a second document format via multiple stages of intermediate formats. It is an object of the present invention to provide a method and apparatus whereby the optimal path for such a multiple stage format transformation may be efficiently determined.

Figure 2:
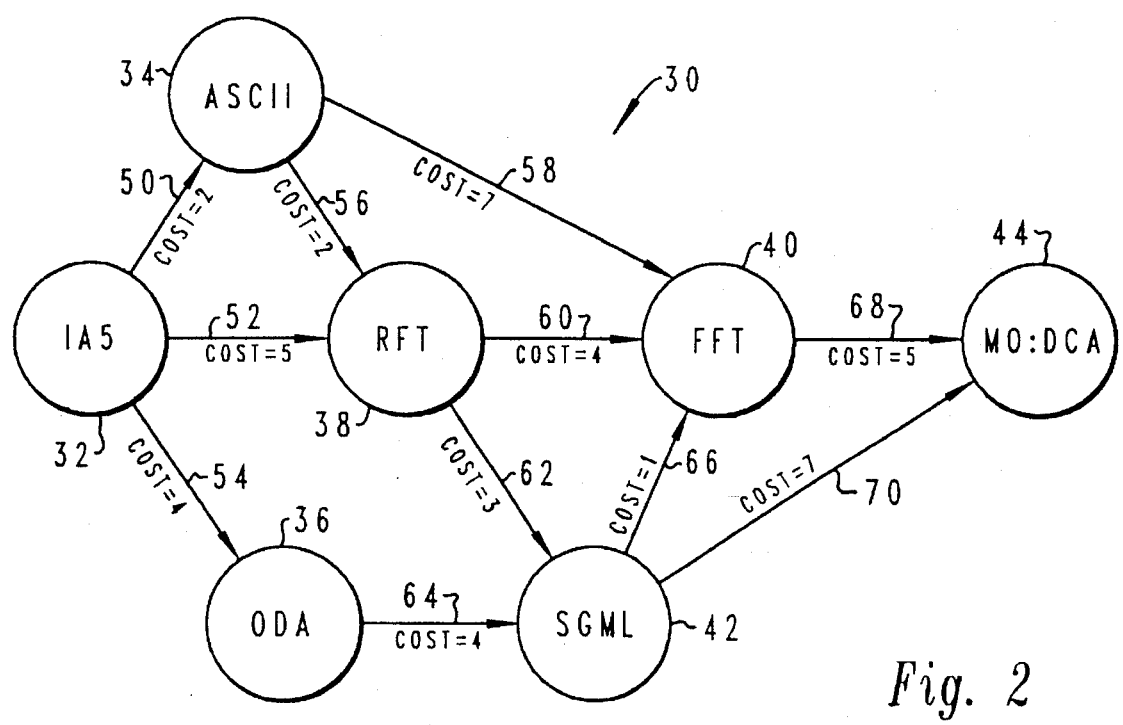
FIG. 2 is an example of graphic representation of a format type network which is created and utilized with the method and apparatus of the present invention.

Referring now to FIG. 2 there is depicted a graphic representation of a format type network 30 which may be utilized to implement the method and apparatus of the present invention. As may be seen, document type format 30 is graphically depicted as a network of nodes. Each node within document type network 30 is associated with an identified object type or format within a data processing system 10. Thus, node 32 is associated with International ASCII (IA5), node 34 is associated with the ASCII format, etc. Thus, each object type or format type within data processing system 10 is identified and associated with a node in a format type network which may be graphically depicted in the manner illustrated within FIG. 2.

Next, in accordance with an important feature of the present invention a plurality of links are provided representative of each format type transformation application which is available to convert a document of object from one format type to a second format type. Thus, link 50 is utilized to depict the existence of a format type transformation application which is capable of converting International ASCII (IA5) to ASCII format. Similarly, link 56 is utilized to depict the existence of a format type transformation application capable of converting ASCII format to Revisable Format Text (RFT) format. Thus, link 56 is depicted as connecting node 34 with node 38.

In this manner, a format type network may be created having a plurality of nodes, each associated with an individual format type within a data processing system and a plurality of links are then utilized to interconnect each node within the format type network, in those instances where a format type transformation application exists between two format types. Next, a cost associated with each format type transformation application is also associated with the link which graphically depicts that transformation application.

Those skilled in the art will appreciate that the cost associated with a format type transformation application may be identified utilizing various benchmarks. For example, the cost in time to transform a first format type to a second format type utilizing an associated format type transformation application may be easily quantified and identified. Additionally, selected format type transformation applications may have associated therewith an information loss cost which is representative of the percent of information within the original format type which is lost upon conversion to a second format type utilizing that format type transformation application.

In this manner, a novel document format type network is created having a plurality of nodes, each associated with a format type within a data processing system. Each node within the document format type network is then interconnected with selected other nodes, utilizing links representative of existing format type transformation applications. Further, a cost associated with that format type transformation application is also associated with each of these links.

Next, as depicted within FIGS. 3a–3g, an expenditure array may be created to determine the optimal path from a selected node (IA5) within the format type network of FIG. 2 to a second node within that network. Many such techniques exist within the network art for calculating an optimal path. This then will represent the optimal path in terms of minimal expenditure from a first document format to a second document format in a data processing system having document formats and document format type transformation applications as set forth within format type network 30 of FIG. 2.

As illustrated in FIG. 3a an expenditure array 80 is first created by setting forth within columns 94 and 96 an identification and name for each node within format type network 30. Next, column 98 is utilized to list each format type or node within format type network 30 which is adjacent to a node listed within column 96 and from which the format listed within column 96 may be created by a transformation application. In those instances in which no format exists which may be utilized to create a listed format, a hyphen is placed within column 98. Column 100 is then utilized to set forth the expenditure cost associated with a transformation from the format type listed as an adjacent node within column 98 to the format type listed as the node within column 96.

Those skilled in the art will appreciate upon a review of the first row of expenditure array 80 of FIG. 3a that the cost associated with converting a particular format to the same format will necessarily be zero. Additionally, for purposes of ease in computation the expenditure cost set forth within the expenditure array of FIG. 3a for conversion to a selected format type within column 96 which is not possible from the initial node considered (IA5) is set forth as an arbitrarily large number. In the depicted embodiment of FIG. 3a this value is equal to 10,000.

Next, expenditure array 82 of FIG. 3b depicts an iterative analysis of expenditure array 80 of FIG. 3a in which the expenditure cost is determined for each transformation from an adjacent node within format type network 30 which may be transformed into a node listed within column 96. Therefore, as illustrated within expenditure array 82 of FIG. 3b, the cost of transformation from ASCII format to Revisable Format Text (RFT) and Final Format Text (FFT) is set forth. If the expenditure cost associated with traversing format type network 30 from International ASCII (IA5) to Revisable Format Text (RFT) and Final Format Text (FFT), via ASCII, is less than the previously existing expenditure cost to achieve that transformation, then the new transformation expenditure cost is set forth for the associated multistage transformation.

Thus, the expenditure cost set forth within column 100 of expenditure array 82 for a conversion from International ASCII (IA5) to Revisable Format Text (RFT) via ASCII is now listed as 4 wherein previously a direct conversion from International ASCII (IA5) to Revisable Format Text (RFT) was listed as 5. Thus, the analysis has revealed that an optimal conversion from International ASCII (IA5) to Revisable Format Text (RFT) via ASCII exists. Further, a conversion from International ASCII (IA5) to Final Format Text (FFT) is also possible via ASCII at an expenditure cost of 9, wherein previously no such transformation was possible.

Next, in succession, FIGS. 3c–3g depict expenditure arrays 84, 86, 88, 90 and 92 wherein a similar analysis takes place to determine whether or not conversion from an adjacent node within format type network 30 to a listed node, together with the expenditure cost involved in the previous transformation, is less costly than the previously listed expenditure cost. Thus, upon arriving at expenditure array 92 of FIG. 3g the minimum expenditure cost associated with a transformation from International ASCII (IA5) to all other nodes within the format type network 30 is listed within column 100 of expenditure array 92.

Upon reference to the foregoing those skilled in the art will appreciate that by treating each document or object type within a data processing system 10 as a node within the novel format type network depicted within FIG. 2 and by an analysis of each format type transformation application which is available within data processing system 10, the method and apparatus of the present invention may be utilized to rapidly and efficiently determine an optimal multistage transformation path from a first document format to a second document format via multiple intermediate stages. Of course, an optimal multistage transformation from Revisable Format Text (RFT) format documents will require recalculation of the expenditure arrays depicted within FIGS. 3a–3g beginning with node 38 within format type network 30.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. For example, one alternative embodiment may comprise a document in one language and various translation applications which may be utilized in a multiple stage transformation to translate one document into a different language. Alternately, a document in one medium may be efficiently transformed into a second medium in a multimedia system utilizing the method and apparatus of the present invention. It is therefore contemplated that the appended claims will cover any such modifications or embodiments that fall within the true scope of the invention.

What is claimed is:

1. A method in a data processing system having multiple object types therein and including multiple object type transformation applications for determining an optimal multistage transformation from a first selected object type to a second selected object type, said method comprising the steps of:

identifying each object type within said data processing system;

assigning each identified object type to an associated node within an object type network;

determining an expenditure cost associated with each of said multiple object type transformation applications;

associating each determined expenditure cost with a link between two selected nodes within said object type network; and determining an optimal path through said object type network from a node associated with said first selected object type to a node associated with said second selected object type by means of links having minimal expenditure cost associated therewith.

2. The method in a data processing system having multiple object types therein and including multiple object type transformation applications for determining an optimal multistage transformation from a first selected object type to a second selected object type according to claim 1 wherein said step of assigning each identified object type to an associated node within an object type network comprises the step of assigning each identified object type to an associated node within a graphically depicted object type network.

3. The method in a data processing system having multiple object types therein and including multiple object type transformation applications for determining an optimal multistage transformation from a first selected object type to a second selected object type according to claim 1 wherein said step of determining an expenditure cost associated with each of said multiple object type transformation applications comprises the step of determining a time expenditure cost associated with each of said multiple object type transformation applications.

4. The method in a data processing system having multiple object types therein and including multiple object type transformation applications for determining an optimal multistage transformation from a first selected object type to a second selected object type according to claim 1 wherein said step of determining an expenditure cost associated with each of said multiple object type transformation applications comprises the step of determining an information loss expenditure cost associated with each of said multiple object type transformation applications.

5. The method in a data processing system having multiple object types therein and including multiple object type transformation applications for determining an optimal multistage transformation from a first selected object type to a second selected object type according to claim 1 wherein said step of determining an optimal path through said object type network comprises the step of determining an optimal path through said object type network from a node associated with said first selected object type to all other nodes within said object type network.

6. A data processing system for determining an optimal multistage transformation from a first of a plurality of object types to a second of said plurality of object types via multiple object type transformation applications, said data processing system comprising:

- means for identifying each of said plurality of object types within said data processing system;
- means for assigning each identified object type to an associated node within an object type network;
- means for determining an expenditure cost associated with each of said multiple object type transformation applications;
- means for associating each determined expenditure cost with a link between two selected nodes within said object type network; and
- network analysis means for determining an optimal path through said object type network from a node associated with said first of said plurality of object types to a node associated with said second of said plurality of object types by means of links having minimal expenditure cost associated therewith.

7. The data processing system for determining an optimal multistage transformation from a first of a plurality of object types to a second of said plurality of object types via multiple object type transformation applications according to claim 6 wherein said means for assigning each identified object type to an associated node within an object type network comprises means for assigning each identified object type to an associated node within a graphically depicted object type network and means for graphically displaying said graphically depicted object type network.

8. The data processing system for determining an optimal multistage transformation from a first of a plurality of object types to a second of said plurality of object types via multiple object type transformation applications according to claim 6 wherein said network analysis means comprises means for determining an optimal path from a node associated with said first of said plurality of object types to all other nodes within said object type network by means of links having minimal expenditure cost associated therewith.

* * * * *